US006264720B1

(12) United States Patent
Schowanek et al.

(10) Patent No.: US 6,264,720 B1
(45) Date of Patent: Jul. 24, 2001

(54) SEPARATION OF HEAVY METALS AND MATERIALS FOR USE IN THIS

(75) Inventors: Diederik Rudolf Schowanek, Heusden-Destelbergen; Tom Cornelis Jan Feijtel, Hevillers, both of (BE)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

(21) Appl. No.: 09/341,978

(22) PCT Filed: Jan. 9, 1998

(86) PCT No.: PCT/US98/00591

§ 371 Date: Jul. 21, 1999

§ 102(e) Date: Jul. 21, 1999

(87) PCT Pub. No.: WO98/31779

PCT Pub. Date: Jul. 23, 1998

(30) Foreign Application Priority Data

Jan. 21, 1997 (EP) .................................................. 97870004

(51) Int. Cl.⁷ ...................................................... C22B 3/18
(52) U.S. Cl. ................ 75/300; 75/722; 75/743; 205/560; 423/DIG. 17
(58) Field of Search ............................ 75/722, 300, 743; 423/DIG. 17; 205/560

(56) References Cited

U.S. PATENT DOCUMENTS

| 4,142,952 | 3/1979 | Dalton ................................... 204/106 |
| 4,704,233 | 11/1987 | Hartman et al. ...................... 252/527 |
| 5,569,443 | 10/1996 | Wilson et al. ...................... 423/576.6 |
| 5,929,012 | * 7/1999 | Del Duca et al. ................... 510/303 |

OTHER PUBLICATIONS

Chen, T–C., et al., "Selection and test of effective chelators for removal of heavy metals from contaminated soils", Can. J. Civ. Eng., vol. 22, pp. 1185–1197 (1995).
Jardine, P.M., et al., "Fate and transport of ethylenediaminetetraacetate chelated contaminants in subsurface environments", Geoderma, vol. 67, pp. 125–140 (1995).
Martin, Jr., S.B., et al., "Recycling EDTA after heavy metals extraction", Chemtech, pp. 23–25 (Apr. 1996).

* cited by examiner

*Primary Examiner*—Melvyn Andrews
(74) *Attorney, Agent, or Firm*—Catherine U. Brown; Kelly McDow Dunham; T. David Reed

(57) ABSTRACT

The present invention concerns a composition and method for separating heavy metals from contaminated substrates with compositions containing active agent selected from the group consisting of [S,S]-ethylene diamine disuccinic acid and [S,S]-di-imine butane dioic acid.

30 Claims, No Drawings

SEPARATION OF HEAVY METALS AND MATERIALS FOR USE IN THIS

FIELD OF THE INVENTION

This invention relates to processes and materials for separating heavy metals from substrates such as contaminated soil, sludges, sediments, and industrial residues. In particular it relates to such processes wherein the heavy metals can be recovered for industrial use or can be disposed of separately from the substrate. Additionally, the invention relates to such processes wherein conduct of the process can reduce environmental and other pollution problems due to heavy metal loading without an associated increase or shift in environmental problems due to some other contaminant. The invention also relates to processes and materials particularly suitable for metal recovery.

BACKGROUND TO THE INVENTION

If an aqueous solution containing a chelating agent is exposed to an environment (e.g., a waste material) containing a compound of one or more metals which can be chelated by that chelating agent, some or all of the metals will form a chelate with that chelating agent. A wide variety of chelating agents are known, for instance as reviewed by Chen et al at pages 1185 to 1197 of Can.J.Civ.Eng.Vol 22, 1995. The equilibrium complexation constants for the various chelating agents with the various metals indicates the relative affinity and stability of any particular chelate and, when there is competition between metals, which metals will be chelated in preference to others.

It is known that some chelating agents will preferentially chelate divalent metals such as calcium, magnesium and ferrous iron and are sometimes referred to as hardness complexing agents, while other chelating agents have a particular tendency to form a chelate with heavy metals such as copper, lead, cadmium, zinc, nickel or mercury.

As shown in the article by Chen, there is an extremely large number of chelating agents out of which a selection could be made, but in practice interest has concentrated on relatively few. For example citric acid and NTA are commonly used as hardness complexing agents and EDTA is usually the material of choice for chelating heavy metals. Amongst a wide variety of other chelating agents that are discussed in the literature are various phosphates, phosphonates and various imino acids.

Contamination of soils, sediments and municipal or industrial wastes by heavy metal pollutants is a major environmental problem. For instance there are areas of ground which are contaminated by industrial waste containing heavy metal such that there is a risk of the heavy metal getting into ground water or crops, and there are large volumes of river and sea sediments which are contaminated with toxic heavy metals.

Some major engineering works have been conducted and are being proposed which are designed to extract the top soil or ground water, acid mine drainage, or the sediments or other municipal or industrial wastes in such a way as to reduce the heavy metal contamination, but they all suffer from an inherent problem. This problem arises from the fact that chelants (or other chemical reagents) that may be used for attempting to remove the heavy metal contamination from the soil tend to be relatively ineffective unless they form a very strong chelate with the relevant metal. If they do form a strong chelate, then the result of the process is merely to transfer the environmental problem from a contaminated substrate (which is often solid and reasonably concentrated) to a vast volume of a dilute solution of a stable chelate of the heavy metal.

For example, the article by Chen et al reports the screening of 190 chelating agents (including all those mentioned above) and examines in particular the performance of ADA (acetamido imino diacetic acid), SCMC (amino carboxyalkyl thio proponoic acid) and PDA (pyridine dicarboxylic acid) but does not make any clear recommendations.

Other authors have concentrated on the use of EDTA and have noted its power for extracting heavy metals but have also noted the difficulty of recovering the heavy metal and recycling the EDTA (for instance Jardine et al in Geoderma 67 (1995) 125 to 140 and Martin et al Chem Tech April 1996 pages 23 to 25).

Other authors have concentrated on other ways of treating polluted sediments or ground waters from polluted soil and some of these processes have involved a biological treatment. However the same general problem remains, namely that either removal of the heavy metal is inefficient or the pollution problem is transferred from the soil or sediment in favour of a vast volume of dilute contaminated solution.

Further, the use of EDTA and other preferred chelating agents has the risk of the chelating agent subsequently causing further contamination of the environment, since they persist in the environment.

OBJECT OF THE INVENTION

An object of the invention is to provide processes and materials for enabling the efficient extraction of heavy metal from a substrate without associated further contamination due to the introduction of an environmentally persistent chelating agent. A further object of the invention is to provide processes and materials for separating heavy metals from a substrate under conditions so as to provide a heavy metal concentrate which has a sufficiently high concentration that either it can be used economically as a source of heavy metal or has relatively low volume such that storage or dumping in a controlled environment is economically and environmentally convenient.

SUMMARY OF THE INVENTION

The invention provides a process for separating heavy metal from a water-immiscible substrate, wherein the process comprises extracting the metal from the substrate by contacting the substrate with an aqueous treatment solution containing active [S,S]-EDDS and thereby forming an extract solution of heavy metal chelate, separating the extract solution from the substrate, and then separating the heavy metal from the extract solution.

EDDS is ethylene diamine disuccinic acid or ethylene di-imine butane dioic acid. It can exist in various optical isomeric forms. The form which must be used in the invention is the [S,S] form.

By "active" [S,S]-EDDS we mean [S,S]-EDDS in the form of the ion, the free acid or the alkali metal salt or any other chemical form such that it is capable of acting as a chelating agent for heavy metals.

The invention also includes materials suitable for use in such a process. Included amongst these materials is a composition comprising active [S,S]-EDDS and one or more materials selected from (1) microorganisms or enzymes for promoting release of heavy metal from the substrate, (2) biodegradable surfactant for promoting release of heavy metal from the substrate and/or emulsifying hydrophobic material from the substrate into the aqueous treatment solution, (3) biodegradable hardness chelating agent for preferentially chelating calcium and/or magnesium and/or ferrous metal from the substrate, (4) flotation, coagulation or flocculation agent, (5) acid, base or buffer for altering or controlling the pH of the substrate to a working optimum range, (6) oxidizing or reducing agents to facilitate release of the metals from certain fractions of the substrate, and (7) solvents.

DESCRIPTION OF THE PREFERRED EMBODIMENTS

EDDS

The [S,S]-EDDS is a powerful chelating agent for heavy metals and is readily biodegradable in all environmental compartments by indigenous microorganisms. For instance it is rapidly and substantially completely degraded in a suitable environment within 28 days, and usually within 14 days or less in a batch test. The [S,R] and [R,R] isomers are not readily biodegradable according to EU and OECD regulations.

Our current investigations into [S,S]-EDDS suggest that it is unique amongst all known chelating agents for its combination of strong chelating activity with respect of heavy metals and its biodegradability. The heavy metals are usually one or more of Cu, Cd, Hg, Zn, Pb, Ni and Cr.

EDDS is included in the list of chelating agents in the article by Chen. The use of EDDS compounds as allegedly biodegradable chelating agents, and the existence of various isomers, and their synthesis, has been well known in the literature for many years, see for instance CAS abstract 65:11738F of 1966, CAS abstract 91(5):38875F of 1978, U.S. Pat. No. 3,158,635 and EP 267,653, with the production of [S,S]-EDDS being specifically described by Neal and Rose, Inorganic Chemistry, Volume 7, 1968, pages 2405 to 2412 "Stereospecific oligins and their Complexes of EDDS".

The [R,R] and [R,S]/[S,R] isomers are significantly less biodegradable than the [S,S] isomer and so preferably the EDDS used in the invention consists mainly or essentially only of [S,S]-EDDS. Generally therefore at least 80% by weight and preferably at least 95% by weight of total EDDS is in the [S,S]-EDDS form. Preferably the proportion of [S,S] isomer is as high as is reasonably practicably obtained by whatever synthetic method is being used (such as the method in Neal and Rose) and is preferably as close to 100% as is conveniently attainable.

If any other chelating agents are used in combination with the [S,S]-EDDS it is preferred that they should be biodegradable with the result that the amount of non-biodegradable chelating agent used in the processes of the invention is kept to a minimum, and is preferably less than 50%, and most preferably less than 20 or 10% by weight based on total chelating agent and preferably is zero or as near zero as is conveniently possible. As used herein, "EDDS" refers to EDDS where the [S,S] form is predominant, as described hereinbefore.

As a result of using a highly biodegradable chelating agent, namely [S,S]-EDDS, the process of the invention has the advantage that any of the chelating agent which escapes into the environment is biodegraded within a reasonably short time. Accordingly the process of the invention (unlike processes using materials such as EDTA) does not have the effect of introducing a long-term and undesirable pollutant into the environment.

Extracting the Heavy Metals from the Substrate

The substrate must be water immiscible and insoluble in the sense that it is possible to extract the heavy metal from the substrate by contacting the substrate with the aqueous treatment solution whilst avoiding dissolution of most or all of the substrate into the treatment solution. Generally little or no dissolution of the substrate occurs into the treatment solution.

The substrate may be a water-immiscible liquid. For instance it may be oil contaminated with zinc or other heavy metal. Usually, however, the substrate is a solid or semi-solid material, for instance as a slurry.

The extraction step may be conducted in situ or ex situ, that is to say it may be conducted where the substrate is initially located (in situ) or in a mixing apparatus into which the substrate is transferred (ex situ).

Preferred in situ contact processes comprise percolating the treatment solution through a bed of the substrate and collecting the extract solution from the bed. The percolation may be conducted under gravity or may be forced by pumping the solution through the bed, for instance substantially horizontally.

Such processes are of particular value for treating contaminated soil since the treatment solution can be drained down through a permeable layer of the contaminated soil to collectors beneath the soil or can be pumped across a permeable layer of the soil, for instance from injection points immersed in the soil to collectors immersed in the soil at a lateral distance from the injection points.

The invention is also of use when a stack has been formed of contaminated substrate in which event this stack can, for instance, be sprayed with the treatment solution and the extract solution can be drained off from the bottom of the stack. Examples include the recovery of heavy metal from stacks of municipal or industrial waste such as organic or inorganic discharges, and stacks of waste water sludge or other composting material. Thus, by the invention, it is possible to recover valuable metals from waste or dumps (or other mineral processing or mining wastes) and it is possible to remove the heavy metal pollution of composting material such as municipal waste or agricultural waste.

Ex situ processes of the invention are generally conducted by mixing the treatment solution with the substrate in a mixing or scrubbing reactor or other apparatus. It is necessary for there to be sufficient duration of contact, having regard to the volume and time available, between the treatment solution and the substrate to achieve sufficient extraction of heavy metal from the substrate prior to final separation of the extract solution from the substrate. If there is insufficient extraction of heavy metal in a single pass, the process conveniently can be conducted with the extract solution being separated from the substrate and then recycled within or into the mixing apparatus as treatment solution for the next pass, and with the separation and recycling being conducted as many times as is required. Typically it may be recycled five to ten times or more.

When the substrate is a water-immiscible liquid, separation of the extract solution (either during each recycle or at the end of the final pass) may be by any convenient technique. It can be assisted by flotation but is generally a liquid phase sedimentation process.

When the substrate is a solid, it is normally a particulate solid which can conveniently be mixed with the treatment solution in the mixing apparatus which can be rotating drum or a stirred tank or scrubber system containing mixers such as paddles. The mixing apparatus may thus be, for instance, a simple tank provided with paddles or it may be a more complex arrangement of continuous flow mixers or a counter-current unit. The separation of the extract solution, either after each pass or after the final or only passage through the apparatus, can be by any convenient solids liquid dewatering or separation process such as filtration, sedimentation, centrifugation or flotation.

The ex situ processes of the invention are of particular value when applied to particulate solid materials such as industrially contaminated soil, river or harbour sediment, waste from a mineral mining or processing plant, cellulosic waste solids (for instance sludge or cake from mill waste or a deinking plant), industrial waste sludge solids and municipal sewage sludge solids. The various sludge solids may be supplied to the process of the invention as a slurry or, for instance, more than 2% and often more than 10%, but usually less than 50%, solids in water or they may be supplied as a cake or even a relatively dry material.

In one useful process according to the invention, the invention is combined with the treatment of domestic or industrial waste water whereby, before dewatering the sludge produced in the treatment, the sludge is treated with the EDDS treatment solution so as to extract heavy metals. The treated sludge is dewatered in conventional manner, and the heavy metal is separated from the extract solution by any of the means described before.

In another process of the invention metal-contaminated soil, or river or harbour sediment is subjected to the extraction treatment of the invention. Depending on the composition of the contaminated substrate and the nature of the pollution, the substrate may first be separated in fractions to facilitate the process, after which all or only some of the fractions are treated further. In particular, when the starting material is a mixture of sand with clay or silt, hydrocyclon treatment or other process for separating the sand from the clay or silt will tend to leave a sand fraction having low heavy metal contamination and the silt or clay fraction having higher contamination. This fraction can then be subjected to the process of the invention.

In other processes of the invention part or all of the substrate may initially be in a suspended form in which event it is desirable to bring it out of suspension as a coagulate or flocculate by treating the suspension with a coagulant or flocculant, thereby coagulating or flocculating the suspended material so as to form the substrate which can then be treated with the treatment solution in accordance with the invention.

In order to optimise the release of heavy metal compounds from the substrate into the treatment solution during the extraction process (either in situ or ex situ), it is desirable to include materials which will promote the availability of the heavy metal compounds to the treatment solution. For instance acids or oxidants/reductants may be added prior or in conjunction with EDDS to solubilise heavy metal base, or salts.

Enzymes, or microorganisms which will generate enzymes, which promote the release of heavy metal compounds from the organic fraction of the substrate can be included in the treatment solution. For instance microorganisms or enzymes which will degrade humic or fatty acid, cellulosic, carbohydrate or other materials which will tend to hold the heavy metal compounds to the substrate may be incorporated in the solution. For instance it is possible to use cellulase, lipase or amylase for this purpose. Suitable amounts are 10 to 500 mg (usually as prilled material) per kg substrate.

Surfactant can be included for the purpose of improving contact between the substrate and the treatment solution and/or for emulsifying emulsifiable residues which would otherwise tend to repel the treatment solution from the substrate or prevent or minimise wetting of the substrate by the treatment solution. Also, when the substrate is a water-immiscible liquid, an emulsifier may be used to promote emulsification of the immiscible liquid into water provided that it is possible subsequently to break the emulsion and separate the extract solution from the water-immiscible liquid.

In order to avoid additional loading of the environment by adding surfactant to the substrate, it is preferable that the surfactants should be rapidly and substantially completely biodegradable, by which we mean they should be biodegradable either under substantially the same conditions as are used for biodegrading the EDDS or such that they will biodegrade at a reasonable rate when the effluent from the process reaches the river or other final environment. Preferably the surf actant biodegrades at least 80% (and preferably 100% or close to 100%) under the conditions that result in substantially complete biodegradation of the EDDS during the process of the invention. The surfactant (or surf actant mixture) may be selected from materials that will sorb on to the substrate only to a very low extent.

Suitable anionic surfactants for use in the invention include alkyl (usually $C_{10-14}$) sulphates and ethoxylated alkyl sulphates (both of which are generally readily biodegradable anaerobically or aerobically) and linear alkyl benzene sulphonate when the biodegradation is aerobic and secondary alkane sulphonates.

The use of ethoxylated alkyl sulphates, especially $C_{10-14}$ alkyl with 1 to 4 ethoxy groups, is particularly preferred, alone or in combination with other surfactants.

Suitable non-ionic surfactants which can be used in the invention are ethoxylated fatty alcohols (especially $C_{10-14}$ alkyl with 7–15 ethoxy groups), glucamides, and alkyl polyglycosides.

Other suitable surfactants which can be used in the invention include cationics.

Some or all of the surfactants may be produced biologically, e.g., as in Applied and Environmental Microbiology, October 1992, p 3276 to 3282 and Water Environment Research, Volume 64 No.2, March/April 1992, p 163 to 169.

The total amount of surfactant which is included in the treatment solution is generally from 10 to 20000 mg/l preferably 10 to 5000 mg/l, or 100 mg to 100 g, preferably 100 mg to 20 g per kg substrate. The amount should be above the CMC.

In order that the EDDS is utilised primarily for chelating the environmentally troublesome heavy metals such as copper, cadmium, mercury, zinc and lead, it is often preferred to include also in the treatment solution a hardness complexing agent, which is preferably biodegradable, that is to say a chelant which is preferably substantially biodegradable under the same conditions as the EDDS (or after discharge) and which will preferentially chelate calcium and/or magnesium and/or ferrous iron. Typical hardness complexing agents include citric acid, fatty acids and NTA. Zeolite and phosphate can also be used. The amount may be 100 mg to 20 g/kg substrate.

Other materials which may be included comprise materials to facilitate subsequent separation of the substrate from the extract solution, such as flotation aids (when the separation is by flotation) or inorganic or polymeric coagulants when it is by coagulation or polymeric flocculants when it is by flocculation.

Preferred compositions for use in the invention are single pack compositions which contain EDDS and one or more of (a) microorganisms or enzymes for promoting release of heavy metal, (b) biodegradable surfactant, (c) hardness complexing agent, (d) flotation or coagulant or flocculation aid, and (e) acid, base or buffer. The compositions may be in the form of solids but are often liquids, preferably concentrated liquids. Typically they contain 10–60% (often 10–30%) EDDS, 0–25% (often 5–15%) surfactant system which typically contains AES optionally with AE and/or AS, 5–40% (often 5–20%) hardness complexing agent, 0.2–5% (often 0.5–2%) enzyme, 0–20% other processing aids including e.g. solvents, peptizing polymers, pore blocking agents, balance water (all percentages being by weight).

Separating the Extract Solution from the Substrate

The separation of the extract solution from the substrate can be conducted by known methods which are applicable when the chelating agent is some other material (such as EDTA) in place of the EDDS, such as the separation and recovery techniques proposed in the literature.

Separating the Heavy Metal from the Extract Solution

Thereafter, the separation of the heavy metal from the extract solution (i.e., the solution which is obtained by treating the substrate with the EDDS-containing treatment solution) can be conducted by a number of processes, preferably one of the following processes, or combinations thereof (1) In a first embodiment, the EDDS moieties of the heavy metal chelate in the extract solution are biodegraded thereby releasing the heavy metal from the chelate, and the released heavy metal is separated from the extract solution.

(2) In a second embodiment, the metal and the EDDS moieties of the heavy metal chelate are separated in the extract solution by means other than the biodegradation of EDDS, and the EDDS moieties and the heavy metal are separately recovered from the extract solution. Processes of the second embodiment have the advantage that they allow to remove EDDS which can then be reused, whereas processes of the first embodiment destroy the EDDS.

Various processes according to the second embodiment can be combined, i.e. more than one of such means can be used in sequence, and processes according to the first and second embodiments can also be combined. When processes of the first and second embodiments are combined, the process according to the first embodiment is preferably used last, as a finishing step.

Thus, in the first embodiment the invention offers the additional advantage that the step of biodegradation can be used to degrade substantially all the chelating moieties within a reasonably short time (and often very rapidly), thereby releasing the heavy metal from the chelate. The release of the heavy metal from the chelate then permits convenient and controlled separation of the released heavy metal from the extract solution.

The biodegradation is either conducted aerobically or anaerobically. The extract solution will usually contain sufficient nutrient for effective conduct of the biodegradation but if necessary additional carbon source or other nutrient can be added to promote bacterial growth and the biodegradation process.

The heavy metal which is released from the chelate in the extract solution during the biodegradation can be separated by ion exchange, electrolysis, or other techniques but preferably it is separated by precipitation.

The precipitation may follow as a result of the formation of any suitable insoluble compound of the heavy metal, but generally the most convenient heavy metal compound to be formed as precipitate is the metal sulphide or metal hydroxide. The sulfide can be formed by bacterial reduction of elemental sulphur, sulphate or other oxidized sulphur sources. The conditions that prevail in an anaerobic digester will generally contain sufficient sulphide to cause spontaneous precipitation as heavy metal sulphide of the heavy metal which is released from the chelate by biodegradation. However additional sulphide, for instance bubbled as hydrogen sulphide, may be added to promote the desired precipitation. A sulphate may be added to generate sulphide in situ.

When the digestion is being conducted anaerobically, it is convenient to feed the extract solution containing the chelate, generally at a pH around 6 to 8, into an anaerobic digestion apparatus. Various designs of apparatus can be used. For instance the extract solution can be fed at the base of the reactor beneath a blanket of anaerobic sludge granules maintained at a temperature typically of 15° C.–55° C., preferably 25° C.–40° C. Additional nutrient, for instance in the form of waste water, can also be fed into the reactor with the extract solution. If necessary, the feed may also include inoculum for initiating the biodegradation. If a co-substrate is added during the digestion, methane is generated (and may be utilised as a source of heat or other energy in the process) and water and solids containing metal sulphides (or other separated metal) can be removed continuously or intermittently.

When the digestion is being conducted aerobically, it may be conducted in any suitable reactor such as in a mixed aerated tank at 7 to 30° C. which contains an aqueous suspension of flocculated bacteria and into which the extract solution is pumped (i.e., an activated sludge system), a biological aerated filter, a sandfilter, a trickling filter through a sand or stone bed with bacteria on the solid particles, or by a fluidised bed reactor. Additives may be added to the influent to stimulate and stabilize the reactor, such as e.g. phosphates, iron salts, flocculating agents, etc. The resultant solution, containing dissolved heavy metal compound, can then be passed through an ion exchanger to recover the heavy metal or can be subjected to precipitation, for instance under reduction with hydrogen sulphide, to form the sulphide precipitate, or as a hydroxyde. In any of these processes, the heavy metal can, alternatively, be recovered by electrolytic precipitation from the extract solution after biodegradation.

The heavy metal sulphide or other precipitate can then be recovered either as a relatively concentrated, for instance above 10% and often above 20 or even 50% dry weight aqueous suspension containing heavy metal compound and may; for instance, be recovered from the aqueous liquor by a liquid solids separation process such as filtration, sedimentation, or centrifugation, optionally followed by drying, and may thus be provided as a substantially dry cake or even a powder.

Accordingly, if the material is to be dumped (for instance indefinitely stored or dumped in land fill in containers) the process of the invention has the advantage that the heavy metal contamination is concentrated within a very small volume. However it is also possible to utilise the precipitated or otherwise separated heavy metal for an industrial process, for instance as a source of heavy metal for some industrial use. Thus, by the invention, it is possible to recover industrially useful heavy metal from a substrate and to reuse the recovered heavy metal.

In a second embodiment of the invention the metal and the EDDS moieties of the heavy metal chelate are separated by means other than the biodegradation of EDDS, and the EDDS moieties and the heavy metal are separately recovered from the extract solution. Thus, this second embodiment of the invention offers the advantage that the EDDS is not destroyed, and can therefore be reused.

There are various means to separate the EDDS moieties from the metal in the chelate.

A first means involves exchanging heavy metals against sulphide. The extract solution is contacted with an excess of sulphide, preferably sodium sulphide, at a pH in the range of from 10 to 13. Under these pH conditions, sulphide has a higher affinity for heavy metals than EDDS does. Accordingly, metal sulphide complexes are formed on one hand, and free EDDS on the other hand. The metal sulphide complexes are insoluble and can be precipitated by any of the methods known to the skilled person. Precipitation of the metal sulphide complexes can be facilitated by the use of flocculating agents, such as calcium. Once the metal sulphide complexes have precipitated, an aqueous solution of EDDS is obtained which can be reused to treat another contaminated substrate; as an alternative, that solution can be acidified such that the EDDS is precipitated. This is particularly desirable to obtain more concentrated solutions of EDDS.

A second means involves acidifying the extract solutions such that the interaction between the EDDS moieties and the heavy metals is weakened, then binding the heavy metal on a substrate having a higher affinity for heavy metals than EDDS in those acidified conditions. Such suitable substrates are well known to the skilled person, and include columns or beads of ion-binding resins such as are available in the DOWEX® series, and as described in U.S. Pat. No. 4,031,038 and U.S. Pat. No. 4,098,867. After the heavy metal is bound to the substrate, an aqueous solution is obtained which comprises free EDDS. As before, this solution can be reused, or EDDS can be precipitated therefrom.

A third means involves contacting the extract solution with an electrolysis-cell. The extract solution is provided at the cathode, on which the metals are reduced and precipitate as a film. The resultant solution contains free EDDS. In this cell, the cathode and the anode are separated by a membrane preventing the passage of EDDS to the anode, where it would otherwise be oxidized. As before, this solution can be reused, or EDDS can be precipitated therefrom.

The following are examples of the invention.

EXAMPLE 1 a) Metal extraction from various solids

A sandy soil from a metallurgy site was mixed in a labscale slurry reactor containing a 50 mM [S,S]-EDDS-Na solution at pH 7–9. The slurry had a liquid/solid ratio of 5L/kg and was kept agitated on a rotary shaker (except otherwise noted). The extent (%) of metal extraction from the solid phase was followed by measuring the metal concentration in the aqueous phase and dividing this value by the amount of metal initially present in the soil. The metal concentration in the aqueous phase was determined by flame atomic absorption spectrophotometry following solids removal (centrifugation) and total extraction (ashing and acid extraction) Similar experiments were also carried out with harbour sediments and waste activated sludge (WAS) (a L/S ratio of 50, instead of 5, was used in the case of WAS).

The table 1 illustrates the extent of metal extraction achieved with both the above procedure or -with a more intensive extraction procedure involving high shear rate mixing (propeller-driven at 300 rpm) and the co-additon of various surfactants.

TABLE 1

Extent of metal release after 1 to 6 days reaction time with different metal-polluted solids.

| | Initial metal conc. in the solids (mg/kg dry wt) | Metal extraction (std procedure) (%) | Metal extraction (intensive procedure) (%) |
|---|---|---|---|
| SOIL | | | |
| Zn | 3000 | 70–90 | 95 |
| Pb | 1000 | 65–80 | 95 |
| Cu | 180 | 50–60 | 60 |
| Cd | 35 | 50–60 | 90 |
| HARBOUR SEDIMENTS | | | |
| Zn | 170 | 70–85 | |
| Pb | 60 | 60–80 | |
| Cu | 57 | 85–95 | |
| WAS | | | |
| Zn | 2100 | 85–95 | |
| Pb | 460 | 80–90 | |
| Cu | 415 | 75–95 | | b) Separation of the heavy metals from the extract solution b)1) Chemical recovery via exchange of heavy metals for sulphide The spent extract solution produced in the above example with soil was separated from the soil particles by centrifugation. The supernatant was further processed as such or following the addition of either [S,S]-EDDS-Pb, [S,S]-EDDS-Cu, [S,S]-EDDS-Cd, or [S,S]-EDDS-Ni (each at 10 mN) in order to validate the recovery process under conditions of heavier pollution levels. Solid $Ca(OH)_2$ and $Na_2S$ were added at final concentration of 20 and 11 mM, respectively. After a brief mixing (with a small headspace in order to minimize sulfide oxidation), the mixtures were left standing for two hours (pH 12.4), filtered (8$\mu$m) and analyzed for [S,S]-EDDS and metals. The metal removal efficiencies are summarized in Table 3. All the [S,S]-EDDS remained in solution (as [S,S]-EDDS-Ca) which can therefore be re-used for the cleaning of another batch of soil or, alternatively, be acidified to pH 3–4 in order to recover [S,S]-EDDS via precipitation.

b)2) Chemical recovery by means of acidification/metal binding

The spent extract solutions were amended with additional amounts of various [S,S]-EDDS-Me complexes (as described above) and acidified to a pH value of 2 with concentrated nitric acid. DOWEX® M4195 resin beads were then added in amounts equivalent to thrice the sorption capacity needed to bind all the metals present in the solution (sorption capacity provided by the manufacturer) and the resulting bead suspensions were placed on a shaker for one hour. The M4195 resin is functionalized with bis-(picolyl) amine groups which retain their metal-binding capacity down to pH values of 0.5–1.5, depending on the metals. The metal removal efficiencies are summarized in Table 2. All the [S,S]-EDDS remained in solution which can therefore be re-used for the cleaning of another batch or soil.

b)3) Biological recovery of complexed metals

An alternative option for the treatment of ([S,S]-EDDS-Me)-laden spent extract solutions entails the biodegradation of the [S,S]-EDDS moiety of the complexes resulting in a pH rise and metal precipitation. This approach is most suitable for the treatment of lightly polluted sites (<ca. 1–2 g toxic metals/kg dry soil), i.e. in cases where the quantities of [S,S]-EDDS used are sufficiently small as to not require reuse.

The bioreactor used in this example was a Biological Aerated Filter (BAF) consisting in a 1m high bed of porphyre stones (5–7 mm diam.) through which the spent extractant solution gravity-flowed counter-currently with air injected at the bottom. The spent extractant was pumped to the top of the BAF column where a ponding depth of 30 cm was provided by raising the outlet pipe above the carrier bed. The hydraulic residence time was one day and the organic loading rate was 2–3 g COD/d.L reactor solution (COD refers to the chemical oxygen demand). The BAF columns were fed with spent extractant solutions which had, as described above, been amended with additional amounts of various [S,S]-EDDS-Me complexes (pH 7). The columns were inoculated with 1 L of activated sludge which had been adapted to [S,S]-EDDS-Na.

The performance of a BAF reactor, for which 10 mM $KH_2PO_4$ had been added to the feed solution as a biodegradation aid (pH 7), is illustrated in Table 2. This table indicates that the BAF process is suitable for the removal of easily biodegradable [S,S]-EDDS-Me complexes, and that it could possibly be applied for the removal of slowly biodegradable complexes, e.g. Zn-[S,S]-EDDS or Cu-[S,S]-EDDS, provided a smaller loading rate is used. Note that the precipitated metals are recovered together with the wasted biomass (during the backwash cycles).

TABLE 2

Efficiency of various processes for the removal of metals from ([S,S]-EDDS-Me)-laden spent extract solutions.

| | Initial Me conc. (mg/L) | % Metal removal via sulfide precipitation | % Metal removal via resin binding | % Metal removal in bioreactor |
|---|---|---|---|---|
| Zn | 540 | 99.4 | 90 | 80 |
| Pb | 2100 | 99.9 | 99.8 | 100 |
| Cu | 630 | 99.5 | 99 | 20 |
| Cd | 1130 | 99.9 | 93 | NT |
| Ni | 660 | 7 | 94 | NT |

NT = not tested

Separation modes b, b2 and b3 can be used alternatively or in any combination.

EXAMPLE 2

A Belgian metal-polluted river sediment was pretreated via sieving and hydrocyclone treatment to separate the fraction >55 μm. This sandy fraction was further decontaminated, with focus on the removal of heavy metals (several types of organic pollutants were equally present).

The treatment was executed in a scrubbing unit with slurry concentration of ca. 250 g dry matter per litre water with acidification and chelator treatment at 20° C. First, the pH of the suspension was lowered from 6.7 to 5.0, in combination with the dosage of [S,S]-EDDS (5.5 g/l) together with citrate (1 g/l) and non-ionic surfactant (A12EO9, 100 mg/l). The mixture was allowed to equilibrate for 8h under continuous stirring, after which the pH was lowered further to 2.5 with sulfuric acid, and another 4 hours of contact time was allowed. Subsequently, the sediment was filtered and washed twice with demineralised water (100 ml/250 g slurry). The extraction efficiency of this treatment is shown in Table 3 for the different metals. The acidic metal-containing effluent was neutralised with NaOH to pH 6.5 prior to biological metal-recovery.

TABLE 3

Results of the treatment of the sandy fraction (>55 μm) of a river sediment.

| Metal | Level before cleaning (mg/kg DM) | Level after cleaning (mg/kg DM) | Removal (%) |
|---|---|---|---|
| As | 12 | 9.6 | 20 |
| Cd | 6 | 0.24 | 96 |
| Cu | 218 | 100 | 54 |
| Cr(III) | 85 | 75 | 12 |
| Hg | 6 | 5.76 | 4 |
| Ni | 89 | 54 | 39 |
| Pb | 206 | 43 | 79 |
| Zn | 528 | 93 | 88 |

In one approach, recovery of the metals from the [S,S]-EDDS complex took place in an (aerobic) airlift labscale reactor (5l) which contained 5 g/l of activated sludge that had been acclimated to [S,S]-EDDS (100 mg/l) in domestic waste water for 6 weeks (20° C.). The metal-containing extract was passed (undiluted) through this reactor with a hydraulic residence time (i.e., average contact time) of 8 hours. The effluent was collected and treated with 400 mg sulfide/l in order to precipitate the metals present in solution. A removal >90% was achieved for all metals with this system.

What is claimed is:

1. A process for separating heavy metal from an immiscible substrate comprising extracting the metal from the substrate by contacting the substrate with an aqueous treatment solution containing active agent selected from the group consisting of [S,S]-ethylene diamine disuccinic acid and [S,S]-di-imine butane dioic acid, wherein the agent has a form selected from the group consisting of an ion, a free acid, an alkali metal salt, and any other chemical form capable of acting as a chelating agent for heavy metals, and thereby forming an extract solution of heavy metal chelate, separating the extract solution from the substrate, and then separating the heavy metal from the extract solution.

2. A process according to claim 1 in which the separation of the heavy metal from the extract solution comprises biodegrading the agent moieties of the heavy metal chelate in the extract solution and thereby releasing the heavy metal from the chelate, and separating the released heavy metal from the extract solution.

3. A process according to claim 2 in which the biodegradation is by aerobic biodegradation.

4. A process according to claim 1, in which the separation of the heavy metal from the extract solution comprises separating the heavy metal from the agent moieties in the heavy metal chelate by means other than biodegrading the agent, and separately recovering the heavy metal and the agent moieties from the extract solution.

5. A process according to claim 4, wherein said means comprise exchanging the heavy metal in the chelate for sulphide.

6. A process according to claim 4, wherein said means comprise acidifying the extract solution so as to weaken the interaction between agent and the heavy metal, then binding the heavy metal on a substrate having a higher affinity for heavy metals than agent in those acidified constitutions.

7. A process according to claim 4, wherein said means comprise contacting the extract solution with an electrolysis cell, by providing the extract solution at the cathode, so as to precipitate on said cathode the heavy metals in their reduced form.

8. A process according to claim 7, where more than one said means are used in sequence.

9. A process according to claim 8, followed by a process according to claim 3.

10. A process according to claim 9, wherein the recovered agent is reused.

11. A process according to claim 1 in which the released heavy metal is precipitated from the extract solution.

12. A process according to claim 11 in which the released heavy metal is precipitated as metal sulphide.

13. A process according to claim 1 in which the separated heavy metal is reused.

14. A process according to claim 12 in which the separated heavy metal is dumped.

15. A process according to claim 1 wherein the contact with the substrate and the separation of the extract solution from the substrate is conducted by percolating the treatment solution through a bed of the substrate and collecting the extract solution from the bed.

16. A process according to claim 15 in which the bed is an in situ permeable layer of contaminated soil, a permeable stack of substrate, or a permeable layer of substrate.

17. A process according to claim 14 in which the contact of the substrate with the treatment solution is conducted by mixing the treatment solution with the substrate in a mixing apparatus.

18. A process according to claim 17 in which the extract solution is separated from the substrate and is recycled within or into the mixing apparatus as treatment solution.

19. A process according to claim 18 in which the substrate is a water immiscible liquid.

20. A process according to claim 19 in which the substrate is oil contaminated with heavy metal.

21. A process according to claim 20 in which the extract solution is separated from the substrate by liquid phase sedimentation or flotation.

22. A process according to claim 18 in which the substrate is solid.

23. A process according to claim 22 in which the extract solution is separated from the solid by a solids liquid dewatering process selected from filtration, sedimentation, centrifugation and flotation.

24. A process according to claim 23 in which the solid substrate is selected from industrially contaminated soil, river or harbour sediment, waste from a mineral recovery plant, cellulosic waste solids, industrial waste sludge solids, incinerator ashes, fly ashes, and municipal sewage sludge solids.

25. A process according to claim 24 in which the substrate which is extracted with the treatment solution is clay or silt which has been separated from sand in a sediment by flotation.

26. A process according to claim 24 in which the substrate which is extracted with the treatment solution comprises particulate material formed by coagulation or flocculation of suspended material in an aqueous liquor.

27. A process according to claim 1 in which the aqueous treatment liquor includes at least one material selected from microorganisms or enzymes for promoting release of heavy metal from the substrate, biodegradable surfactant for promoting release of heavy metal from the substrate and/or for emulsifying hydrophobic material from the substrate into the aqueous solution, biodegradable hardness complexing agent for preferentially chelating calcium and/or magnesium and/or ferrous, flotation, coagulation and/or flocculation agent, solvents and acid, base or buffer, oxidizing or reducing agent.

28. A process according to claim 27 in which the aqueous treatment liquor includes surfactant most or all of which is biodegradable and wherein it includes ethoxylated alkyl sulphate.

29. A composition for dilution in water to form an aqueous treatment solution for use in a process for separating heavy metal from an immiscible substrate according to any preceding claim comprising agent selected from the group consisting of [S,S]-ethylene diamine disuccinic acid and [S,S]-di-imine butane dioic acid, wherein the agent has a form selected from the group consisting of an ion, a free acid, an alkali metal salt, and any other chemical form capable of acting as a chelating agent for heavy metals; and one or more materials selected from microorganisms or enzymes for promoting release of heavy metal from the substrate, biodegradable surfactant for promoting release of heavy metal from the substrate and/or for emulsifying hydrophobic material from the substrate into the aqueous solution, biodegradable chelating builder for preferentially chelating calcium and/or magnesium and/or ferrous, flotation, coagulation, and/or flocculation agent, solvents and acid, base or buffer, oxidizing or reducing agent;

wherein the substrate is selected from the group consisting of a water-immiscible liquid, a semi-solid material, and a solid material; wherein the solid material is selected from the group consisting of contaminated soil, river or harbour sediment, waste from a mineral recovery plant, cellulosic waste solids, industrial waste sludge solids, incinerator ashes, fly ashes, and municipal sewage sludge solids.

30. A composition according to claim 29 in which the composition includes surfactant most or all of which is biodegradable and which includes biodegradable ethoxylated alkyl sulphate.

* * * * *